United States Patent
Zhou et al.

(10) Patent No.: US 12,349,025 B2
(45) Date of Patent: Jul. 1, 2025

(54) METHOD AND DEVICE FOR CONTROLLING MOBILE PLATFORM

(71) Applicant: SZ DJI TECHNOLOGY CO., LTD., Shenzhen (CN)

(72) Inventors: You Zhou, Shenzhen (CN); Jinsong Li, Shenzhen (CN); Jie Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 808 days.

(21) Appl. No.: 17/180,559

(22) Filed: Feb. 19, 2021

(65) Prior Publication Data
US 2021/0171200 A1 Jun. 10, 2021

Related U.S. Application Data

(63) Continuation of application No. PCT/CN2018/101893, filed on Aug. 23, 2018.

(51) Int. Cl.
*H04W 4/024* (2018.01)
*G01S 19/05* (2010.01)
(Continued)

(52) U.S. Cl.
CPC ............. *H04W 4/024* (2018.02); *G01S 19/05* (2013.01); *H04W 4/021* (2013.01);
(Continued)

(58) Field of Classification Search
CPC .... B64C 39/024; H04W 4/024; H04W 4/021; H04W 84/06; G01S 19/05; B64U 2201/20; B64U 2101/30
See application file for complete search history.

(56) References Cited

U.S. PATENT DOCUMENTS

| | | | |
|---|---|---|---|
| 2016/0003636 A1* | 1/2016 | Ng-Thow-Hing | G01C 21/365 701/418 |
| 2017/0357273 A1* | 12/2017 | Michini | G05D 1/0033 |
| 2018/0004231 A1* | 1/2018 | Michini | G05D 1/0094 |

FOREIGN PATENT DOCUMENTS

| | | |
|---|---|---|
| CN | 103576690 A | 2/2014 |
| CN | 104714557 A | 6/2015 |

(Continued)

OTHER PUBLICATIONS

The World Intellectual Property Organization (WIPO) International Search Report for PCT/CN2018/101893 Jun. 4, 2019 7 pages.

*Primary Examiner* — Gertrude Arthur Jeanglaude
(74) *Attorney, Agent, or Firm* — ANOVA LAW GROUP, PLLC

(57) ABSTRACT

The present disclosure provides a device for controlling a mobile platform. The device includes a processor; and a memory storing program instructions that, when being executed by the processor, cause the processor to receive an instruction to enter a point of interest (POI) circle mode; and enter the POI circle mode, the POI circle mode including a target determination phase, a target estimation phase, and a circling phase in sequence. The mobile platform determines a circling target during the target determination phase. The mobile platform detects a position of the circling target during the target estimation phase. The mobile platform circles the circling target based on the position of the circling target during the circling phase.

20 Claims, 3 Drawing Sheets

(51) Int. Cl.
*H04W 4/021* (2018.01)
*B64U 101/30* (2023.01)
*H04W 84/06* (2009.01)

(52) U.S. Cl.
CPC ...... *B64U 2101/30* (2023.01); *B64U 2201/20* (2023.01); *H04W 84/06* (2013.01)

(56) References Cited

FOREIGN PATENT DOCUMENTS

| | | | |
|---|---|---|---|
| CN | 106054737 | A | 10/2016 |
| CN | 106598226 | A | 4/2017 |
| CN | 106657779 | A | 5/2017 |
| CN | 106843275 | A | 6/2017 |
| CN | 106895847 | A | 6/2017 |
| CN | 106909172 | A | 6/2017 |
| CN | 107000839 | A | 8/2017 |
| CN | 107544481 | A | 1/2018 |
| CN | 107643759 | A | 1/2018 |
| CN | 107807659 | A | 3/2018 |
| WO | 2018036285 | A1 | 3/2018 |

\* cited by examiner

METHOD AND DEVICE FOR CONTROLLING MOBILE PLATFORM

CROSS-REFERENCE TO RELATED APPLICATION

This application is a continuation of International Application No. PCT/CN2018/101893, filed on Aug. 23, 2018, the entire content of which is incorporated herein by reference.

TECHNICAL FIELD

The present disclosure relates to the technical field of terminal technology and, more specifically, to a method and device for controlling a mobile platform.

BACKGROUND

With the continuous advancement of science and technology, the functions of mobile platforms, such as smart cars, unmanned aerial vehicles (UAVs), and other mobile devices, are constantly improving. The application fields for mobile platforms are also expanding. For example, UAVs can be used for professional aerial photography, agricultural irrigation, electric grid cruising, remote sensing and mapping, security monitoring, etc. The mobile platform is generally controlled by a control terminal, such as a remote control, a mobile phone, a tablet, a wearable device, etc.

The process of controlling the mobile platform to circle a target is very complicated. Therefore, there is a need to improve the convenience in controlling the mobile platform to accomplish this task.

SUMMARY

One aspect of the present disclosure provides a device for controlling a mobile platform. The device includes a processor; and a memory storing program instructions that, when being executed by the processor, cause the processor to receive an instruction to enter a point of interest (POI) circle mode; and enter the POI circle mode, the POI circle mode including a target determination phase, a target estimation phase, and a circling phase in sequence. The mobile platform determines a circling target during the target determination phase. The mobile platform detects a position of the circling target during the target estimation phase. The mobile platform circles the circling target based on the position of the circling target during the circling phase.

Another aspect of the present disclosure provides A mobile platform. The mobile platform includes a power device configured to provide power for the mobile platform; a mobile platform control device including a processor; and a memory storing computer program instructions. When being executed by the processor, the computer program instructions cause the processor to receive an instruction to enter a point of interest (POI) circle mode; and enter the POI circle mode, the POI circle mode including a target determination phase, a target estimation phase, and a circling phase in sequence. The target determination phase is used to determine a circling target. The target estimation phase is used for the mobile platform to detect a position of the circling target. The circling phase is used for the mobile platform to circle the circling target based on the position of the circling target.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

In order to make the objectives, technical solutions, and advantages of the present disclosure more clear, the technical solutions in the embodiments of the present disclosure will be described below with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

The terms used in the one or more implementations of the present specification are merely for illustrating specific implementations, and are not intended to limit the one or more implementations of the present specification. The terms "a", "said", and "the" of singular forms used in the one or more implementations of the present specification and the appended claims are also intended to include plural forms, unless otherwise specified in the context clearly. It should also be understood that the term "and/or" used in the present specification indicates and includes any or all possible combinations of one or more associated listed items.

It should be understood that although terms "first", "second", "third", etc. may be used in the one or more implementations of the present specification to describe various types of information, the information is not limited to the terms. These terms are used to differentiate information of the same type. For example, without departing from the scope of the one or more implementations of the present specification, the first information can also be referred to as the second information, and similarly, the second information can also be referred to as the first information. Depending on the context, for example, the word "if" used here can be explained as "while", "when", or "in response to determining".

Embodiments of the present disclosure provides a method and device for controlling a mobile platform. In some embodiments, the control device of the mobile platform can be included in an apparatus, and the apparatus may be a mobile platform or a control terminal for controlling the mobile platform. In some embodiments, the mobile platform may include, but is not limited to, UAVs, unmanned ships, ground robots (such as unmanned vehicles), etc. The control terminals may include, but is not limited to, mobiles phones, tablet computers, remote controls, wearable devices (watches or bracelets), etc.

Figure 1:
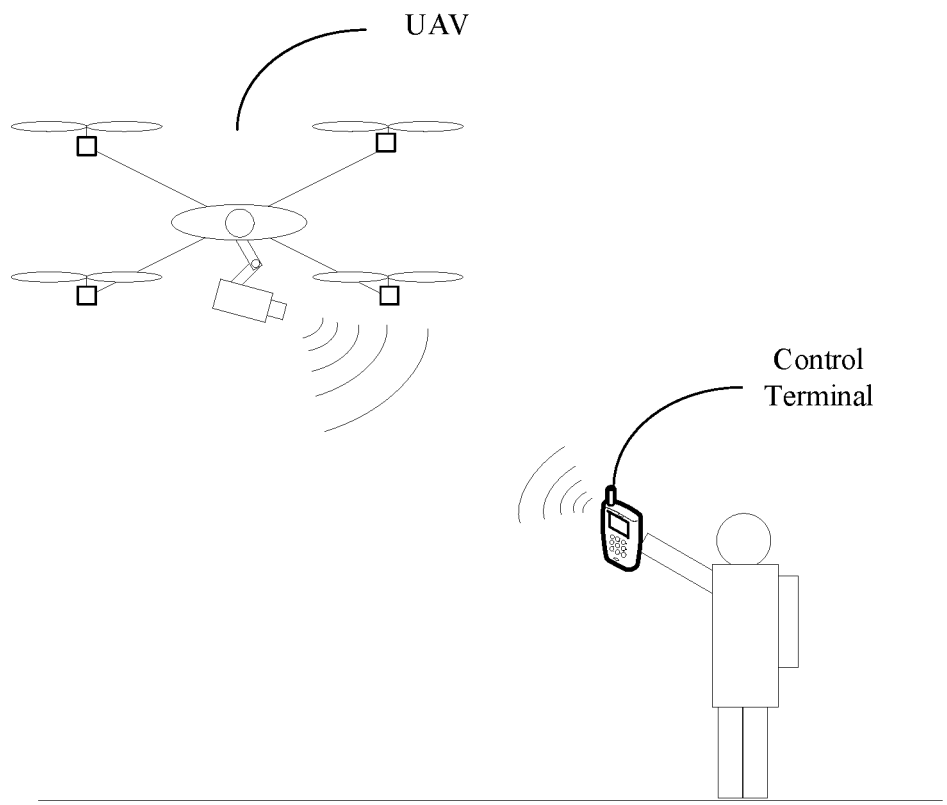
FIG. 1 is a schematic diagram of a system architecture according to an embodiment of the present disclosure.

FIG. 1 is a schematic diagram of a system architecture of a mobile platform and a control terminal according to an embodiment of the present disclosure. In FIG. 1, the mobile platform is taken as a UAV and the control terminal is taken as a mobile phone as an example. The control terminal can be used to control the UAV. In some embodiments, the UAV may include an operating body, a gimbal, and an imaging device. The operating body may include a plurality of rotors and a plurality of rotor motors to drive the plurality of rotors to rotate, thereby providing the power needed for the operation of a UAV 1. The imaging device can be mounted on the operating body via the gimbal. The imaging device can be used for image or video capturing during the operation of the UAV, and may include, but is not limited to, a multi spectral imager, a hyperspectral imager, a visible light camera, an infrared camera, etc. The gimbal may be a multi-axis transmission and stabilization system, which can include multiple rotating shafts and gimbal motors. The gimbal motors can compensate the imaging angle of the imaging device by adjusting the rotation angle of the rotating shaft, and can prevent or reduce the shaking of the imaging device by setting an appropriate buffer mechanism. Of course, the imaging device can be directly mounted on the operating body, or the imaging device can be mounted on the operating body in other ways, which is not limited in the embodiments of the present disclosure.

The specific process of the method for controlling the mobile platform in the embodiments of the present disclosure will be described in detail below.

Figure 2:
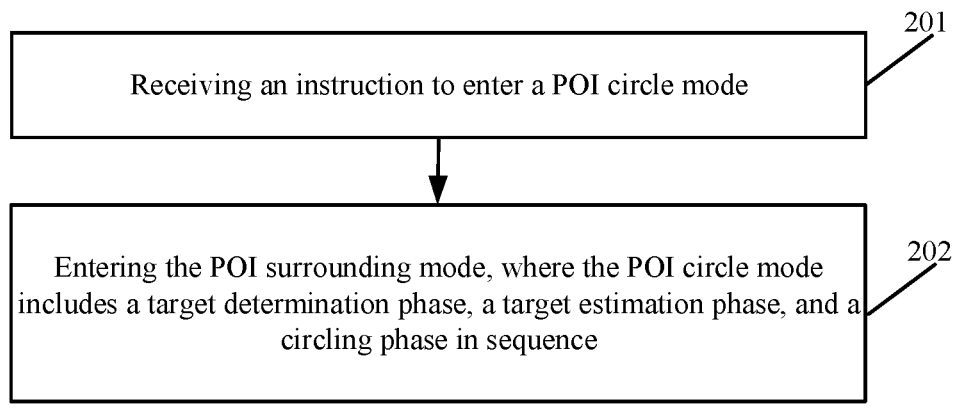
FIG. 2 is a flowchart of a method for controlling a mobile platform according to an embodiment of the present disclosure.

Referring to FIG. 2, which is a flowchart of a method for controlling a mobile platform according to an embodiment of the present disclosure. The method will be described in detail below.

201, receiving an instruction to enter a point of interest (POI) circle mode.

More specifically, a device can receive an instruction to enter the POI circle mode, where the device can be a control terminal or a mobile platform. In some embodiments, when the device is a control terminal, the instruction for entering the POI circle mode may be input by the user at the control terminal. For example, the user may click the function button for entering the POI circle mode on a display interface of the control terminal to input an instruction for entering the POI circle mode.

In some embodiments, when the device is a mobile platform, the instruction for entering the POI circle mode may be sent by the control terminal to the mobile platform.

In some embodiments, the POI circle mode may be a POI circle time-lapse shooting mode. That is, when circling the circling target, a time-lapse shooting can be performed on the circling target. Of course, the POI circle mode may also be a POI circle normal shooting mode. That is, when circling the circling target, a normal shooting can be performed on the circling target. The normal shooting mode may refer to a non-time-lapse shooting.

202, entering the POI circle mode, where the POI circle mode may include a target determination phase, a target estimation phase, and a circling phase in sequence.

More specifically, the device can enter the POI circle mode, where the target determination phase may be used to determine the circling target, the target estimation phase may be used for the mobile platform to detect the position of the circling target, and the circling phase may be used for the mobile platform to circle the circling target based on the position of the circling target.

That is, after the device enters the POI circle mode, the mobile platform can be controlled to circle the target. Therefore, by implementing the method described in FIG. 2, the mobile platform can be conveniently controlled to circle the target.

In some embodiments, before the device enters the POI circle mode, whether a first parameter meets a first predetermined condition can be determined. The first parameter may include one or more of the global positioning system (GPS) information of the mobile platform, the operating parameters of the mobile platform, and the connection state between the mobile platform and the control terminal. Correspondingly, in one embodiment, the method for the device to enter the POI circle mode may include entering the POI circle mode if the first parameter meets the first predetermined condition.

In this embodiment, the device may be a control terminal or a mobile platform. In this embodiment, after receiving the instruction to enter the POI circle mode, the device may obtain the first parameter, and determine whether the first parameter meets the first predetermined condition. If the first parameter meets the first predetermined condition, then the device can enter the POI circle mode. In this embodiment, when the device is a control terminal and the first parameter includes the GPS information of the mobile platform or the operating parameters of the mobile platform, the control terminal may obtain the GPS information of the mobile platform or the operating parameters of the mobile platform from the mobile platform.

When the first parameter meets the first predetermined condition, the device may be suitable to enter the POI circle mode. When the first parameter does not meet the first predetermined condition, the device may not be suitable to enter the POI circle mode. For example, the first parameter may include the GPS signal level of the mobile platform, and the first predetermined condition may be the GPS signal level of the mobile platform being greater than a predetermined level. When the GPS signal level of the mobile platform does not meet the first predetermined condition, that is, when the GPS signal level of the mobile platform is low, the mobile platform may not be able to accurately determine the position of the circling target, resulting in the mobile platform not accurately circling the target. Therefore, when the GPS signal level of the mobile platform does not meet the first predetermined condition, the device may not be suitable to enter the POI circle mode to control the mobile platform to circle the target. In another example, the first parameter may be the connection state of the mobile platform and the control terminal, and the first parameter may be the connection state of the mobile platform and the control terminal being a connected state. When the connection state between the mobile platform and the control terminal does not meet the first parameter, that is, when the mobile platform is out of control, the mobile platform can be controlled to return home. Therefore, it may not be suitable for the device to enter the POI circle mode to control the mobile platform to circle the target.

Therefore, by implementing this embodiment, the device can enter the POI circle mode at a suitable time, and then the mobile platform can be controlled to circle the target.

In some embodiments, the device may also determine whether the first parameter meets the first parameter in the POI circle mode. The first parameter may include one or more of the GPS information of the mobile platform, the operating parameters of the mobile platform, and the connection state of the mobile platform and the control terminal. If the first parameter does not meet the first predetermined condition, the POI circle mode can be exited.

In this embodiment, the device may be a control terminal or a mobile platform. In this embodiment, after the device enters the POI circle mode, the device may obtain the first parameter in the POI circle mode, and determine whether the first parameter meets the first predetermined condition. If the first parameter does not meet the first predetermined condition, the POI circle mode can be exited. In this embodiment, when the device is a control terminal and the first parameter includes the GPS information of the mobile platform or the operating parameters of the mobile platform, the control terminal may obtain the GPS information of the mobile platform or the operating parameters of the mobile platform from the mobile platform.

When the first parameter does not meet the first predetermined condition, the mobile platform may not be suitable for circling the target. Therefore, by implementing this embodiment, the device can exit the POI circle mode in time at a suitable time.

In some embodiments, the GPS information of the mobile platform may include one or more of the GPS signal level of the mobile platform, the navigation coordinate system, and the GPS position of the mobile platform. For example, the GPS information of the mobile platform may only include one of the GPS signal level of the mobile platform, the navigation coordinate system, and the GPS position of the mobile platform. Alternatively, the GPS information of the mobile platform may include any two of the GPS signal level of the mobile platform, the navigation coordinate system, and the GPS position of the mobile platform. Alternatively, the GPS information of the mobile platform may include the GPS signal level of the mobile platform, the navigation coordinate system, and the GPS position of the mobile platform.

When the GPS signal level of the mobile platform is too low or the navigation coordinate system is invalid, the mobile platform may not be able to accurately determine the position of the circling target, resulting in the mobile platform not being able to accurately circle the target. When the GPS position of the mobile platform is abnormal or the GPS position of the mobile platform reaches a restricted area (such as near an airport, etc.), the mobile platform may not be suitable to circle the target at this time. Therefore, the device can accurately determine whether it is suitable to enter the POI circle mode or whether the POI circle mode should be exited based on one or more of the GPS signal level of the mobile platform, the navigation coordinate system, and the GPS position of the mobile platform.

In some embodiments, when the first parameter includes the GPS signal level of the mobile platform, the first predetermined condition may include the GPS signal level of the mobile platform being greater than or equal to the predetermined level. When the first parameter includes the navigation coordinate system, the first parameter may include the navigation coordinate system being valid. When the first parameter includes the GPS position of the mobile platform, the first predetermined condition may include the GPS position of the mobile platform not being abnormal and/or the GPS position of the mobile platform not reaching the restricted area.

For example, after the device receives the instruction to enter the POI circle mode, the device can obtain the first parameter. The first parameter may include the GPS signal level of the mobile platform, the navigation coordinate system, and the GPS position of the mobile platform. The first predetermined condition may include the GPS signal level of the mobile platform is greater than or equal to the predetermined level, the navigation coordinate system is valid, the GPS position of the mobile platform is normal, and the GPS position of the mobile platform does not reach the restricted area. If the GPS signal level in the first parameter is greater than or equal to the predetermined level, the navigation coordinate system in the first parameter is valid, and the GPS position in the first parameter is normal and does not reach the restricted area, the device may enter the POI circle mode.

In another example, after the device enters the POI circle mode, the device may obtain the first parameter in the POI circle mode. The first parameter may include the GPS signal level of the mobile platform, the navigation coordinate system, and the GPS position of the mobile platform. The first predetermined condition may include the GPS signal level of the mobile platform is greater than or equal to the predetermined level, the navigation coordinate system is valid, the GPS position of the mobile platform is normal, and the GPS position of the mobile platform does not reach the restricted area. If the GPS signal level in the first parameter is less than the predetermined level, or the navigation coordinate system in the first parameter is invalid, or the GPS position in the first parameter is abnormal, or the GPS position in the first parameter reaches the restricted area, the device may exit the POI circle mode.

By implementing this embodiment, the device can accurately determine whether it is suitable to enter the POI circle mode or whether it should exit the POI circle mode.

In some embodiments, the operating parameters of the mobile platform may include the operating distance of the mobile platform and/or the operating height of the mobile platform.

When the mobile platform is not a device that can fly, the operating parameters of the mobile platform may include the operating distance of the mobile platform.

When the mobile platform is a device that can fly, the operating parameters of the mobile platform may include the operating distance of the mobile platform, or the operating parameters may include the operating height of the mobile platform, or the operating parameters of the mobile platform may include the operating distance of the mobile platform and the operating height of the mobile platform.

When the mobile platform is flying relative far or relatively high, the mobile platform may not be suitable for circling the target. Therefore, the device can accurately determine whether it is suitable to enter the POI circle mode or whether it should exit the POI circle mode based on the operating distance and/or the operating height of the mobile platform.

In some embodiments, when the first parameter includes the operating distance of the mobile platform, the first predetermined condition may include the operating distance of the mobile platform being less than or equal to a restricted distance. When the first parameter includes the operating height of the mobile platform, the first predetermined condition may include the operating height of the mobile platform being greater than or equal to a predetermined height.

For example, after the device receives the instruction for entering the POI circle mode, the device may obtain the first parameter. The first parameter may include the operating distance of the mobile platform and the operating height of the mobile platform. The first predetermined condition may include the operating distance of the mobile platform being less than or equal to the restricted distance and the operating height of the mobile platform being greater than or equal to the predetermined height. If the operating distance in the first parameter is less than or equal to the restricted distance, and the operating height in the first parameter is greater than or equal to the predetermined height, the device may enter the POI circle mode.

In another example, after the device enters the POI circle mode, the device may obtain the first parameter in the POI circle mode. The first parameter may include the operating distance of the mobile platform and the operating height of the mobile platform. The first predetermined condition may include the operating distance of the mobile platform being less than or equal to the restricted distance and the operating height of the mobile platform being greater than or equal to the predetermined height. If the operating distance in the first parameter is greater than the restricted distance, or the operating height in the first parameter is less than the predetermined height, the device may exit the POI circle mode.

By implementing this embodiment, the device can accurately determine whether it is currently suitable to enter the POI circle mode or whether it should exit the POI circle mode.

In some embodiments, when the first parameter includes the connection state between the mobile platform and the control terminal, the first predetermined condition may include the connection state between the mobile platform and the control terminal being a connected state.

When the connection state of the mobile platform and the control terminal is disconnected, that is, when the mobile platform is out of control, the mobile platform should return home. At this time, the mobile platform may not be suitable for circling the target. Therefore, the device may accurately determine whether it is suitable to enter the POI circle mode or whether it should exit the POI circle mode based on the connection state of the mobile platform and the control terminal.

For example, take the first parameter including the GPS signal level of the mobile platform, the navigation coordinate system, the GPS position of the mobile platform, the operating distance of the mobile platform, the operating height of the mobile platform, and the connection state of the mobile platform and the control terminal as an example. As shown in Table 1 below, when the GPS signal level of the mobile platform is greater than or equal to the predetermined level, the navigation coordinate system is valid, the GPS position is not abnormal and the GPS position does not reach the restricted area, the operating distance is less than or equal to the restricted distance, the operating height is greater than or equal to the predetermined height, and the connection state is connected, the device may enter the POI circle mode. In the POI circle mode, when the GPS signal level of the mobile platform is less than the predetermined level, or the navigation coordinate system is invalid, or the GPS position is abnormal or the GPS position reaches the restricted area, or the operating distance is greater than the restricted distance, or the operating height is less than the predetermined height, or the connection state is not connected, the device may exit the POI circle mode.

TABLE 1

| First Parameter | Enter the POI circle mode | Exit the POI circle mode |
| --- | --- | --- |
| GPS signal level of the mobile platform | GPS signal level of the mobile platform is greater than or equal to the predetermined level | GPS signal level of the mobile platform is less than the predetermined level |
| Navigation coordinate system | Navigation coordinate system is valid | Navigation coordinate system is invalid |
| GPS position of the mobile platform | GPS position of the mobile platform is normal and the GPS position does not reach the restricted area | GPS position of the mobile platform is abnormal or the GPS position reaches the restricted area |
| Operating distance of the mobile platform | Operating distance is less than or equal to the restricted distance | Operating distance is greater than the restricted distance |
| Operating height of the mobile platform | Operating height is greater than or equal to the predetermined height | Operating height is less than the predetermined height |
| Connection state of the mobile platform and the control terminal | Connection state is the connected state | Connection state is the disconnected state |

In some embodiments, in the POI circle mode, the operating height of the mobile platform may be greater than or equal to a first threshold and greater than or equal to a second threshold, where the first threshold may be equal to the predetermined height in Table 1 above. For example, the first threshold may be 5 meters, the second threshold may be 15 meters, and the first threshold may be equal to the predetermined height. After the device determines that the operating height of the mobile platform is greater than or equal to 5 meters, the device may enter the POI circle mode. The operating height of the mobile platform in the POI circle mode may remain greater than or equal to 5 meters and less than or equal to 15 meters. In the POI circle mode, the operating height of the mobile platform remains greater than or equal to the predetermined height. Therefore, the device does not need to determine whether the operating height of the mobile platform is less than the predetermined height in the POI circle mode.

By implementing this embodiment, after entering the POI circle mode, the operating height of the mobile platform can be maintained at a reasonable height, such that the mobile platform can normally circle the circling target.

In some embodiments, in the POI circle mode, when the height of the mobile platform reaches the first threshold or the second threshold, the device may push an alert message. The alert message may be used to notify that the height of the mobile platform has reached the first threshold or the second threshold. In this embodiment, the mobile platform may be a device that can fly. By pushing the alert message when the height of the mobile platform reaches the first threshold or the second threshold, the user can be prompted that the operating height of the mobile platform has reached the restricted height in time.

When the device is a control terminal, the control terminal can directly push the alert message to the user. For example, the control terminal can directly output the alert message on the display screen for prompting that the height of the mobile platform has reached the first threshold or the second threshold. When the device is a mobile platform, the mobile platform can push the alert message to the control terminal.

In some embodiments, as shown in Table 2 below, in the idle phase, when the device detects a pause instruction or an obstacle, the device may not respond to the pause instruction and the obstacle, that is, the pause instruction and the obstacle can be ignored.

In some embodiments, as shown in Table 2 below, in the idle phase and the circling phase, the user can freely and remotely control the mobile platform.

TABLE 2

| Event | Idle Phase | Observation Phase | Waiting Confirmation Phase | Target Estimation Phase | Circling phase |
|---|---|---|---|---|---|
| Pause Instruction | No response | Return to idle phase | Return to idle phase | Return to idle phase | Pause circling task |
| Detecting Obstacle | No response | No response | No response | Return to idle phase | Pause circling task |
| Detecting Remote Control Instruction | User can freely and remotely control the mobile platform | Return to idle phase | Return to idle phase | Remote control the mobile platform to roll in the direction opposite to the direction of movement on the roll axis, and return to the idle phase | User can freely and remotely control the mobile platform |
| Focal Length | Unlock focal length | Lock focal length | Lock focal length | Lock focal length | Unlock the focal length in the POI circle normal shooting mode, and lock the focal length in the POI circle time-lapse shooting mode |

After the control terminal receives the alert message, the control terminal can put the alert message to the user.

In some embodiments, the target determination phase may include an idle phase. The idle phase can be used to wait to receive frame selection information for the circling target, and to receive the frame selection information. More specifically, the idle phase can be used to control the terminal or the mobile platform to wait to receive the frame selection information for the circling target, and to receive the frame selection information. That is, in the idle phase, the user can select the circling targets. By implementing this embodiment, users can flexibly select the circling targets. In conventional technology, if the mobile platform needs to circle the circling target, the mobile platform needs to be remotely controlled to move the position of the circling target. After the mobile platform moves to the position of the circling target, the geographic location of the circling target can be determined through GPS or other technologies, and then the mobile platform can circle the circling target based on the geographic location of the circling target. However, by implementing this embodiment, after the user frame-selects the circling target in the display screen during the idle phase, the mobile platform can automatically detect the geographic location of the circling target based on the frame-selected information, without the mobile platform moving to the position of the circling target. Therefore, by implementing this embodiment, the position of the circling target can be quickly and conveniently detected.

In some embodiments, the target determination phase may also include an observation phase. The observation phase may come after the idle phase. The observation phase can be used to modify the frame selection area corresponding to the frame selection information. The circling target of the frame selection can be accurately determined by modifying the frame selection area.

In some embodiments, in the observation phase, if the texture of the frame-selected area is insufficient or the frame-selected area is smaller than a predetermined size, the device may push an alert message for prompting to re-select the circling target.

In this embodiment, the device may be a control terminal or a mobile platform. In some embodiments, in the observation phase, if the frame selection area has insufficient texture or the frame-selected area is smaller than the predetermined size, in addition to pushing the alert message, the device may also need to wait to receive the frame selection information for the circling target. That is, in the observation phase, if the frame selection area has insufficient texture or the frame selection area is smaller than the predetermined size, it may be needed to return to the idle phase such that the user can re-select the circling target. Take the device as the control terminal for an example. In the observation phase, if the frame selection area has insufficient texture or the frame-selected area is smaller than the predetermined size, the control terminal may directly push the alert message to the user to prompt the user to re-select the circling target, and the control terminal may wait to receive the frame selection information for the circling target.

In this embodiment, if the frame selection area has insufficient texture or the frame selection area is smaller than the predetermined size, the mobile platform may not be able to accurately detect the position of the circling target. Therefore, the user may need to re-select the target that needs to be circled. Therefore, by implementing this embodiment, the mobile platform can accurately detect the position of the circling target.

In some embodiments, in the observation phase, the device may control the mobile platform to rotate the yaw angle such that the circling target can be displayed in the middle position of the display interface of the control terminal, such that the circling target can be confirmed in the waiting confirmation phase.

In this embodiment, the device may be a control terminal or a mobile platform. By implementing this embodiment, the circling target can be displayed in the middle position of the display interface of the control terminal, which can facilitate the user to confirm the circling target during the waiting confirmation phase.

In some embodiments, as shown in Table 2 above, in the observation phase, if the device detects a pause instruction and/or a remote control instruction to remotely control the mobile platform, it will wait to receive the frame selection information for the circling target again. That is, in the observation phase, if the device detects a pause instruction and/or a remote control instruction to remotely control the mobile platform, it will return to the idle phase.

In this embodiment, the device may be a control terminal or a mobile platform. In this embodiment, the remote control instruction may be a remote control instruction for remotely controlling the mobile platform to move in any direction. In some embodiments, when the device detects a remote control instruction to the mobile platform, the device may output a prompt message that the current task has been exited in addition to waiting to re-select the circling target. If the mobile platform is remotely controlled during the observation phase, the frame-selected circling target may no longer exist in the current display screen of the control terminal, therefore, it may be needed to return to the idle phase and perform the frame selection of the circling target again. Therefore, by implementing this embodiment, the device can return to the idle phase in time at the right time. In addition, by implementing this embodiment, in the observation phase, when the user wants to re-select the circling target, the user may click a pause button to return to the idle phase. Therefore, by implementing this embodiment, the device can easily return to the idle phase.

In some embodiments, as shown in Table 2 above, in the observation phase, if the device detects an obstacle, the device may ignore the obstacle, that is, the device may not response to the obstacle.

In some embodiments, as shown in Table 2 above, in the idle phase and the circling phase, the focal length of the imaging device of the mobile platform may be in an unlocked state. In the observation phase, and the target estimation phase, the focal length of the imaging device of the mobile platform may be in a locked state.

The focal length of the imaging device of the mobile platform may be in the locked state in the observation phase and the target estimation phase, such that the mobile platform can accurately measure the position of the circling target during the target estimation phase. Therefore, by implementing this embodiment, the mobile platform can accurately measure the position of the circling target during the target estimation phase.

It should be noted that the POI circle mode in this embodiment may be the POI circle normal shooting mode. That is, the POI circle mode in this embodiment may be a mode for normal shooting of the circling target when circling the circling target.

In some embodiments, as shown in Table 2 above, the POI circle mode may be the POI circle time-lapse shooting mode. In the idle phase, the focal length of the imaging device of the mobile platform may be in the unlocked state, and in the observation phase, the target estimation phase, and the circling phase, the focal length of the imaging device of the mobile platform may be in the locked state.

Similarly, in the observation phase and the target estimation phase, the focal length of the imaging device of the mobile platform may be in the locked state, such that the mobile platform can accurately measure the position of the circling target in the target estimation phase. In addition, the time-lapse shooting needs to maintain the same exposure parameters and focal length of the field of view as the observation phase, the waiting confirmation phase, and the target estimation phase. Therefore, the focal length of the imaging device may still be in the locked state in the circling phase.

By implementing this embodiment, the mobile platform can accurately measure the position of the circling target in the target estimation phase.

In some embodiments, the target determination phase may also include the waiting confirmation phase. The waiting confirmation phase may come after the idle phase. In the waiting confirmation phase, the frame-selected circling target can be confirmed. The circling target can be accurately determined by the user reconfirming the circling target again.

If the target determination phase includes the idle phase, the observation phase, and the waiting confirmation phase, the idle phase may be before the observation phase, and the observation phase may be before the waiting confirmation phase.

In some embodiments, in the waiting confirmation phase, if the device detects a pause instruction and/or a remote control instruction to remotely control the mobile platform, the device may wait again to receive the frame selection information for the circling target. That is, in the waiting confirmation phase, if the device detects a pause instruction and/or a remote control instruction to remotely control the mobile platform, the device may return to the idle phase.

In this embodiment, the device may be a control terminal or a mobile platform. In this embodiment, the remote control instruction may be a remote control instruction for remotely controlling the mobile platform to move in any direction. In some embodiments, when the device detects a remote control instruction to the mobile platform, the device may output a prompt message that the current task has been exited in addition to waiting to re-select the circling target. If the mobile platform is remotely controlled during the observation phase, the frame-selected circling target may no longer exist in the current display screen of the control terminal, therefore, it may be needed to return to the idle phase and perform the frame selection of the circling target again. Therefore, by implementing this embodiment, the device can return to the idle phase in time at the right time. In addition, by implementing this embodiment, in the waiting confirmation phase, when the user wants to select the circling target again, the user may click the pause button to return to the idle phase. Therefore, by implementing this embodiment, the device can easily return to the idle phase.

In some embodiments, as shown in Table 2 above, in the waiting confirmation phase, if the device detects an obstacle, the device may ignore the obstacle, that is, the device may not respond to the obstacle.

In some embodiments, as shown in Table 2 above, in the idle phase and the circling phase, the focal length of the imaging device of the mobile platform may be in the unlocked state. In the waiting confirmation phase and the target estimation phase, the focal length of the imaging device of the mobile platform may be in the locked state.

When the focal length of the imaging device of the mobile platform is in the locked state in the waiting confirmation phase and the target estimation phase, the mobile platform can accurately measure the position of the circling target in the target estimation phase. Therefore, by implementing this embodiment, the mobile platform can accurately measure the position of the circling target during the target estimation phase.

It should be noted that the POI circle mode in this embodiment may be a POI circle normal shooting mode. That is, the POI circle mode in this embodiment may be a mode for normal shooting of the circling target when circling the circling target.

In some embodiments, as shown in Table 2 above, the POI circle mode may be the POI circle time-lapse shooting mode. In the idle phase, the focal length of the imaging device of the mobile platform may be in the unlocked state, and in the waiting confirmation phase, the target estimation phase, and the circling phase, the focal length of the imaging device of the mobile platform may be in the locked state.

Similarly, in the waiting confirmation phase and the target estimation phase, the focal length of the imaging device of the mobile platform may be in the locked state, such that the mobile platform can accurately measure the position of the circling target in the target estimation phase. In addition, the time-lapse shooting needs to maintain the same exposure parameters and focal length of the field of view as the waiting confirmation phase and the target estimation phase. Therefore, the focal length of the imaging device may still be in the locked state in the circling phase.

By implementing this embodiment, the mobile platform can accurately measure the position of the circling target during the target estimation phase.

In some embodiments, as shown in Table 2 above, in the target estimation phase, if the device detects a pause instruction and/or detects the presence of an obstacle and/or detects a remote control instruction for remotely controlling the mobile platform to roll in the direction opposite to the direction of movement of the target axis, then the device may wait again to receive the frame selection information for the circling target. That is, if the device detects a pause instruction and/or detects the presence of an obstacle and/or detects a remote control instruction for remotely controlling the mobile platform to roll in the direction opposite to the direction of movement of the target axis, the device may return to the idle state.

In this embodiment, the device may be a control terminal or a mobile platform.

In some embodiments, in the target estimation phase, if a pause instruction is detected, the device will not only wait for the frame selection of the circling target again, but the device can also output a prompt message for the termination of the task of measuring the position of the circling target. By implementing this embodiment, in the target estimation phase, when the user wants to select the circling target again, the user may click the pause button to return to the idle phase. Therefore, by implementing this embodiment, the device can easily return to the idle phase.

In the target estimation phase, the mobile platform may first need to approximately estimate a first distance of the mobile platform from the circling target. Alternatively, the first distance may also be a default value. Subsequently, the mobile platform may circle the circling target based on the first distance, and measure the position of the circling target during the circling phase. If an obstacle is detected in the target estimation phase, when the mobile platform circles the target during the target estimation phase, the mobile platform may collide with the obstacle. Therefore, when an obstacle is detected in the target estimation phase, the device may return to the idle phase and re-select the circling target to avoid collision with the obstacle during the circling phase. It can be seen that when an obstacle is detected, waiting to receive the frame selection information for the circling target again can improve the safety of the mobile platform.

In some embodiments, in the target estimation phase, if the device detects an obstacle, in addition to waiting to receive the frame selection information for the circling target, the device can also output a prompt message that the current task has been terminated when the obstacle is encountered in the position calculation process.

In some embodiments, the target axis mentioned above may be any axis. For example, when the mobile platform is a device that can fly, the target axis may be a roll axis. In the target estimation phase, if the remotely controlled mobile platform rolls in the direction opposite to the direction of movement of the target axis, the mobile platform may not be able to accurately measure the position of target. As such, the device may need to return to the idle phase and re-select the circling target. Therefore, by implementing this embodiment, the device can accurately measure the position of the circling target.

In some embodiments, in the target estimation phase, if it is detected that the mobile platform has lost the circling target and/or the positioning of the mobile platform is inaccurate, the device may wait again to receive the frame selection information for the circling target. That is, in the target estimation phase, if the mobile platform loses its circling target and/or the positioning of the mobile platform is inaccurate, the device may return to the idle phase.

In this embodiment, the device may be a control terminal or a mobile platform.

In some embodiments, in the target estimation phase, if the mobile platform loses the circling target, the device may not only wait to receive the frame selection information for the circling target, but the device may also output a prompt message that the current task has been terminated.

In some embodiments, in the target estimation phase, if the positioning of the mobile platform is not accurate, the device may not only wait to receive the frame selection information for the circling target, but the device may also output a prompt message that the current task has been terminated.

In the target estimation phase, if the mobile platform loses the circling target and/or the positioning of the mobile platform is inaccurate, the mobile platform cannot measure the position of the circling target. As such, the device may need to return to the idle phase and re-select the circling target. Therefore, by implementing this embodiment, the device can accurately measure the position of the circling target.

In some embodiments, in the target estimation phase, the first distance to the circling target may be estimated, and a first parallax value corresponding to the first distance may be determined based on the correspondence between the distance and the number of parallaxes. If the number of parallaxes between the current image taken by the mobile platform and the first image taken by the mobile platform during the target estimation phase reaches the first parallax value, it may indicate that the position of the target is not detected. As such, the device may terminate the current task of measuring the position of the circling target, and wait again to receive the frame selection information for the circling target.

Figure 3:
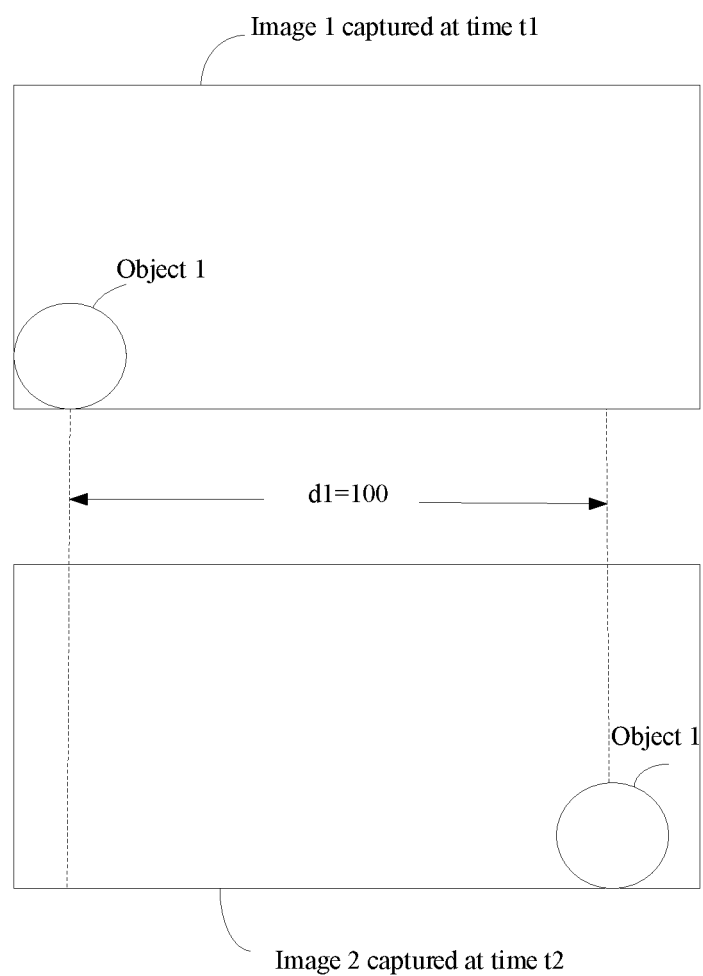
FIG. 3 is a schematic diagram of a parallax according to an embodiment of the present disclosure.

In this embodiment, the parallax may be distance between two images of the same object taken at different times. For example, as shown in FIG. 3, image 1 is an image taken at time t1, and image 2 is an image taken at time t2. Both image 1 and image 2 include an object 1, therefore, the parallax of image 1 and image 2 is d1, that is, 100 pixels.

In this embodiment, the device may be a mobile platform. In the target estimation phase, the mobile platform may first need to approximately estimate a first distance of the mobile platform from the circling target. Alternatively, the mobile platform may consider the distance of the mobile platform to the circling target as the default distance, that is, the first distance may be a default value. Then, the mobile platform may circle the circling target based on the first distance, and measure the position of the circling target during the circling phase. After obtaining the first distance, the mobile platform may determine the first parallax value corresponding to the first distance based on the correspondence between the distance and the number of parallaxes. In the target estimation phase, in the circling process, the mobile platform may capture a plurality of images. After each image is taken, the mobile platform may detect whether the number of parallaxes between the currently taken image and the first image taken in the target estimation phase reaches the first parallax value. If the position of the circling target has not been detected after reaching the first parallax value, the current task of measuring the position of the circling target can be terminated. After the mobile platform terminates the current task of measuring the position of the circling target, the control terminal can wait for the frame selection of the circling target again, that is, return to the idle phase.

The mobile platform may preset the correspondence between the distance and the number of parallaxes. If the circling target is far away, the actual distance corresponding to each parallax may be very large, and a small parallax change may correspond to a larger actual distance. Similarly, if the circling target is close, the actual distance corresponding to each parallax may be very small, and a larger parallax change may correspond to a smaller actual distance. Therefore, when the circling target is far away, the position of the circling target may be measured within a smaller parallax range. When the circling target is close, the position of the circling target may be measure in a larger parallax range. Therefore, a larger distance may be set to correspond to a smaller number of parallaxes, and a smaller distance may be set to correspond to a larger number of parallaxes. For example, the correspondence may be as shown in Table 3 below. When the distance of the circling target is 0<d2<300 meters, the position of the circling target may be measured within 100 pixels of parallax. Therefore, when the distance to the circling target is 0<d2<300 meters, the number of parallaxes between the currently captured image and the first image captured during the target estimation phase reaches 100 pixels, and the position of the circling target has not been measured, the position of the circling target may not be detected due to some reasons. At this time, the current task of measuring the position of the circling target should be terminated, and the circling target should be selected again. Similarly, when the distance to the circling target is 300<d2<1000 meters, the position of the circling target may be measured within $[(-9/70)*d2+970/7]$ pixels of parallax. Therefore, when the distance to the circling target is 300<d2<1000 meters, the number of parallaxes between the currently captured image and the first image captured during the target estimation phase reaches $[(-9/70)*d2+970/7]$ pixels, and the position of the circling target has not been measured, the position of the circling target may not be detected due to some reasons. At this time, the current task of measuring the position of the circling target should be terminated, and the circling target should be selected again. Similarly, when the distance to the circling target is greater than 1000 meters, the position of the circling target may be measured within 10 pixels of parallax. Therefore, when the distance to the circling target is greater than 1000 meters, the number of parallaxes between the currently captured image and the first image captured during the target estimation phase reaches 10 pixels, and the position of the circling target has not been measured, the position of the circling target may not be detected due to some reasons. At this time, the current task of measuring the position of the circling target should be terminated, and the circling target should be selected again. It can be seen that by implementing this embodiment, the number of parallaxes can be flexibly determined based on the distance to the circling target, such that it can be determined it time whether the mobile platform can detect the position of the circling target.

TABLE 2

| Number of parallax d1 | Distance to the circling target d2 |
|---|---|
| 100 | 0 < d2 < 300 meters |
| $[(-9/70)*d2 + 970/7]$ | 300 < d2 < 1000 meters |
| 10 | >1000 meters |

In some embodiments, as shown in Table 2 above, in the circling phase, if the device detects a pause instruction and/or detects the presence of an obstacle, the device may suspend the current circling task of the mobile platform.

In this embodiment, the device may be a control terminal or a mobile platform. If the device is a control terminal, in the circling phase, if the control terminal detects a pause instruction, and control terminal may send a pause circling instruction to the mobile platform to pause the current circling task of the mobile platform. When the device is a mobile platform, after the control terminal receives the paus instruction, it may send the pause instruction to the mobile platform. After receiving the pause instruction in the circling phase, the mobile platform may suspend the current circling task of the mobile platform.

In some embodiments, in the circling phase, if a pause instruction is detected, the device may not only pause the current circling task of the mobile platform, but the device may also output a prompt message to prompt the termination of the circling task. More specifically, if the device is a control terminal, the control terminal may directly output the prompt message for prompting the termination of the circling task to the user. If the device is a mobile platform, the mobile platform may output a prompt message for prompting the termination of the circling task to the control terminal. After receiving the prompt message, the control terminal may output the prompt message to the user.

By implementing this embodiment, in the circling phase, when the user wants to pause the current circling task of the mobile platform, the user may click the pause button to pause the current circling task of the mobile platform. Therefore, by implementing this embodiment, the current circling task of the mobile platform can be easily suspended.

In this embodiment, if the device is a control terminal, then the mobile platform may prompt whether there is an obstacle in the control terminal. After the control terminal receives the prompt message sent by the mobile platform for reminding the presence of the obstacle, the control terminal may suspend the current circling task of the mobile platform. More specifically, the control terminal may send a pause instruction to the mobile platform to suspend the current circling task of the mobile platform. By implementing this embodiment, the safety of the mobile platform can be improved.

In some embodiments, in the circling phase, if a first remote control instruction is detected, the device may adjust the circling radius of the mobile platform. In this embodiment, the device may be a mobile platform or a control terminal.

By implementing this embodiment, the user can adjust the circling radius of the mobile platform.

In some embodiments, in the circling phase, if a second remote control instruction is detected, the device may adjust the circling linear velocity of the mobile platform. In this embodiment, the device may be a mobile platform or a control terminal.

By implementing this embodiment, the user can adjust the circling linear velocity of the mobile platform.

Figure 4:
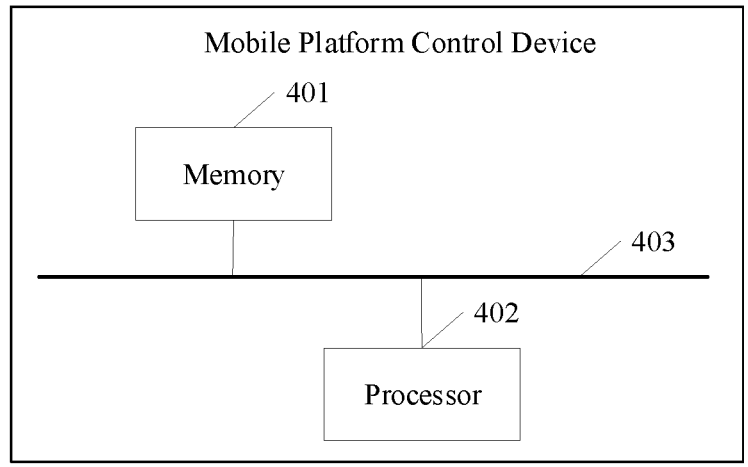
FIG. 4 is a schematic structural diagram of a mobile platform control device according to an embodiment of the present disclosure.

Referring to FIG. 4, which is a schematic structural diagram of a control device for a mobile platform according to an embodiment of the present disclosure. The control device of the mobile platform can be used to realize the function of the device in the above method embodiment. As shown in FIG. 4, the control device of the mobile platform includes a memory 401 and a processor 402. In some embodiments, the memory 401 and the processor 402 may be connected through a bus system 403. In some embodiments, the control device of the mobile platform may include a communication device configured to communicate with other devices. The communication device, the memory 401, and the processor 402 may be connected via the bus system 403.

The memory 401 can store program instructions. The memory 401 may include a volatile memory, such as a random-access memory (RAM). The memory 401 may also include a non-volatile memory, such as a flash memory, a solid-state drive (SSD), etc. The memory 401 may also include a combination of the aforementioned types of memories.

The processor 402 may include a central processing unit (CPU). The processor 402 may further include a hardware chip. The hardware chip may be an application-specific integrated circuit (ASIC), a programmable logic device (PLD), etc. The PLD described above may be a field-programmable gate array (FPGA), a general array logic (GAL), etc. In some embodiments, the processor 402 can be configured to execute the program instructions stored in the memory 401. When executed by the processor 402, the program instructions can cause the processor 402 to receive an instruction to enter a point of interest (POI) circle mode; and enter the POI circle mode, where the POI circle mode may include a target determination phase, a target estimation phase, and a circling phase in sequence.

In some embodiments, the target determination phase may be used to determine the circling target, the target estimation phase may be used for the mobile platform to detect the position of the circling target, and the circling phase may be used for the mobile platform to circle the circling target based on the position of the circling target.

In some embodiments, the program instructions may further cause the processor 402 to determine whether the first parameter meets the first predetermined condition before entering the POI circle mode. The first parameter may include one or more of the GPS information of the mobile platform, the operating parameters of the mobile platform, and the connection state of the mobile platform and the control terminal. If the first parameter does not meet the first predetermined condition, the POI circle mode can be exited.

The method for the processor 402 to enter the POI circle mode may include entering the POI circle mode if the first parameter meets the first predetermined condition.

In some embodiments, the program instructions may further cause the processor 402 to determine whether the first parameter meets the first predetermined condition in the POI circle mode. The first parameter may include one or more of the GPS information of the mobile platform, the operating parameters of the mobile platform, and the connection state of the mobile platform and the control terminal. If the first parameter does not meet the first predetermined condition, the POI circle mode can be exited. If the first parameter does not meet the first predetermined condition, the POI circle mode may be exited.

In some embodiments, the GPS information of the mobile platform may include one or more of the GPS signal level of the mobile platform, the navigation coordinate system, and the GPS position of the mobile platform.

In some embodiments, when the first parameter includes the GPS signal level of the mobile platform, the first predetermined condition may include the GPS signal level of the mobile platform being greater than or equal to the predetermined level. When the first parameter includes the navigation coordinate system, the first predetermined condition may include the navigation coordinate system being valid. When the first parameter includes the GPS position of the mobile platform, the first predetermined condition may include the GPS position of the mobile platform being normal and/or the GPS position of the mobile platform not reaching the restricted area.

In some embodiments, the operating parameters of the mobile platform may include the operating distance of the mobile platform and/or the operating height of the mobile platform.

In some embodiments, when the first parameter includes the operating distance of the mobile platform, the first predetermined condition may include the operating distance of the mobile platform being less than or equal to the restricted distance. When the first parameter includes the operating height of the mobile platform, the first predetermined condition may include the operating height of the mobile platform being greater than or equal to the predetermined height.

In some embodiments, when the first parameter includes the connection state between the mobile platform and the control terminal, the first predetermined condition may include the connection state of the mobile platform and the control terminal being in a connected state.

In some embodiments, in the POI circle mode, the operating height of the mobile platform may be greater than or equal to the first threshold and less than or equal to the second threshold.

In some embodiments, the program instructions may further cause the processor 402 to push an alert message when the operating height of the mobile platform reaches the first threshold or the second threshold in the POI circle mode.

In some embodiments, the target determination phase may include the idle phase, and the idle phase may be used to wait to receive the frame selection information for the circling target, and to receive the frame selection information.

In some embodiments, the target determination phase may also include an observation phase. The observation phase may come after the idle phase. The observation phase may be used to modify the frame selection area corresponding to the frame selection information.

In some embodiments, the program instructions may further cause the processor 402 to push an alert message for prompting to perform the frame selection of the circling target again if the frame selection area has insufficient texture and/or the frame selection area is smaller than the predetermined size in the observation phase.

In some embodiments, the program instructions may further cause the processor 402 to control the mobile platform to rotate the yaw angle in the observation phase, such that the circling target can be displayed in the middle of the display interface of the control terminal.

In some embodiments, the program instructions may further cause the processor 402 to wait to receive the frame selection information for the circling target again if a pause instruction and/or a remote control instruction to remotely control the mobile platform is detected.

In some embodiments, in the idle phase and the circling phase, the focal length of the imaging device of the mobile platform may be in an unlocked state. In the observation phase, and the target estimation phase, the focal length of the imaging device of the mobile platform may be in a locked state.

In some embodiments, the POI circle mode may be the POI circle time-lapse shooting mode. In the idle phase, the focal length of the imaging device of the mobile platform may be in the unlocked state, and in the observation phase, the target estimation phase, and the circling phase, the focal length of the imaging device of the mobile platform may be in the locked state.

In some embodiments, the target determination phase may also include the waiting confirmation phase. The waiting confirmation phase may come after the idle phase. The waiting confirmation phase can be used to confirm the frame-selected circling target.

In some embodiments, the program instructions may further cause the processor 402 to wait to receive the frame selection information for the circling target again if a pause instruction and/or the a remote control instruction for remotely controlling the mobile platform is detected in the waiting confirmation phase.

In some embodiments, in the idle phase and the circling phase, the focal length of the imaging device of the mobile platform may be in the unlocked state. In the waiting confirmation phase and the target estimation phase, the focal length of the imaging device of the mobile platform may be in the locked state.

In some embodiments, the POI circle mode may be the POI circle time-lapse shooting mode. In the idle phase, the focal length of the imaging device of the mobile platform may be in the unlocked state, and in the waiting confirmation phase, the target estimation phase, and the circling phase, the focal length of the imaging device of the mobile platform may be in the locked state.

In some embodiments, the program instructions may further cause the processor 402 to wait to receive the frame selection information for the circling target again if a pause instruction and/or a remote control instruction to remotely control the mobile platform to roll in the direction opposite to the direction of movement of the target axis is detected in the target estimation phase.

In some embodiments, the program instructions may further cause the processor 402 to wait for the frame selection information of the circling target again if the mobile platform loses the circling target and/or the positioning of the mobile platform is inaccurate in the target estimation phase.

In some embodiments, the program instructions may further cause the processor 402 to estimate the first distance to the circling target in the target estimation phase; determine the first parallax value corresponding to the first distance based on the correspondence between the distance and the number of parallaxes; and terminate the current task of measuring the position of the circling target and wait to receive the frame selection information of the circling target again if the number of parallaxes between the current image taken by the mobile platform and the first image taken by the mobile platform during the target estimation phase reaches the first parallax value, and the position of the circling target is not detected.

In some embodiments, the program instructions may further cause the processor 402 to suspend the current circling task of the mobile platform if a pause instruction and/or an obstacle is detected in the circling phase.

In some embodiments, the program instructions may further cause the processor 402 to adjust the circling radius of the mobile platform if the first remote control instruction is detected in the circling phase.

In some embodiments, the program instructions may further cause the processor 402 to adjust the circling linear velocity of the mobile platform if the second remote control instruction is detected in the circling phase.

Based on the same concept of the present disclosure, the principle of the mobile platform control device provide in the embodiments of the present disclosure can be used to improve the conventional technology described in the method embodiments of the present disclosure. Therefore, for the implementation of the mobile platform control device, reference may be made to the implementation of the mobile platform control method. For the beneficial effects of the mobile platform control device, reference may be made to the beneficial effects of the mobile platform control method. For brevity, details will be not repeated here.

Figure 5:
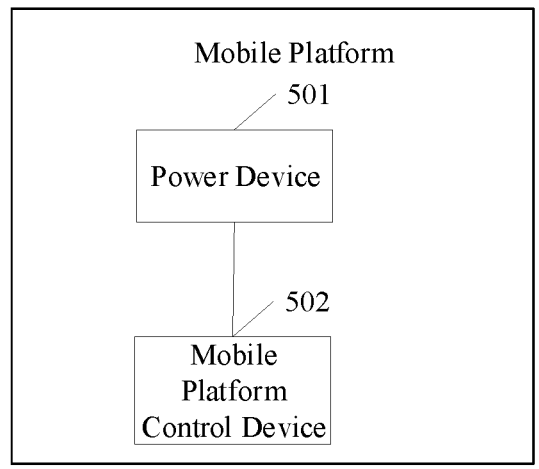
FIG. 5 is a schematic structural diagram of a mobile platform according to an embodiment of the present disclosure.

Referring to FIG. 5, which is a schematic structural diagram of a mobile platform according to an embodiment of the present disclosure. As shown in FIG. 5, the mobile platform includes a power device 501 and any type of mobile platform control device 502 described in FIG. 4, where the power device 501 can be used to provide power for the mobile platform.

An embodiment of the present disclosure further provides a computer-readable storage medium. The computer-readable storage medium can store instructions. When the instructions are executed by a computer, the instructions can cause the computer to execute the method described in any of the above method embodiments.

A person skilled in the art should realize that in one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device for controlling a mobile platform, comprising:
at least one processor; and
at least one memory including computer program code, where the at least one memory and the computer program code are configured, with the at least one processor, to cause the device to at least:
determine a target;
determine a distance between the mobile platform and the target;
and
after the distance is determined, control the mobile platform to circle the target based on the determined distance, wherein the mobile platform does not circle the target before the distance is determined, and the device is carried by the mobile platform.

2. The device of claim 1, wherein the at least one memory and the computer program code are further configured, with the at least one processor, to:
determine whether a first parameter satisfies a first predetermined condition, the first parameter including one or more of GPS information of the mobile platform, operating parameters of the mobile platform, and a connection state between the mobile platform and a control terminal; and
control the mobile platform to circle the target in response to the first parameter satisfying the first predetermined condition.

3. The device of claim 2, wherein:
when the first parameter includes a GPS signal level of the mobile platform, the first predetermined condition includes the GPS signal level of the mobile platform being greater than or equal to a predetermined level;
when the first parameter includes a navigation coordinate system, the first predetermined condition includes the navigation coordinate system being valid; or
when the first parameter includes a GPS position of the mobile platform, the first predetermined condition includes the GPS position of the mobile platform being normal and/or the GPS position of the mobile platform not reaching a restricted area.

4. The device of claim 2, wherein:
when the first parameter includes the connection state between the mobile platform and the control terminal, the first predetermined condition includes the connection state of the mobile platform and the control terminal being in a connected state.

5. The device of claim 1, wherein:
an operating height of the mobile platform is greater than or equal to a first threshold and less than or equal to a second threshold when the mobile platform circles the target.

6. The device of claim 5, wherein the at least one memory and the computer program code are further configured, with the at least one processor, to:
push an alert message in response to the operating height of the mobile platform reaching the first threshold or the second threshold when the mobile platform circles the target.

7. The device of claim 1, wherein the at least one memory and the computer program code are further configured, with the at least one processor, to:
wait to receive selection information for the target; and
receive the selection information.

8. The device of claim 7, wherein the at least one memory and the computer program code are further configured, with the at least one processor, to:
wait for the selection information for the target again when a pause instruction or a remote control instruction for remotely controlling the mobile platform is detected.

9. The device of claim 7, wherein:
the at least one memory and the computer program code are further configured, with the at least one processor, to after the mobile platform receives the selection information, confirm the target selected;
in response to the mobile platform being in a first mode, a focal length of an imaging device of the mobile platform is in an unlocked state when the mobile platform waits to receive the selection information, receives the selection information, and circles the target, and the focal length of the imaging device of the mobile platform is in a locked state when the mobile platform confirms the target selected and determines the distance; and
in response to the mobile platform being in a second mode, the focal length of the imaging device of the mobile platform is in the unlocked state when the mobile platform waits to receive the selection information and receives the selection information, and the focal length of the imaging device of the mobile platform is in the locked state when the mobile platform confirms the target selected, determines the distance, and circles the target, the second mode being a time-lapse shooting mode.

10. The device of claim 1, wherein the at least one memory and the computer program code are further configured, with the at least one processor, to:
wait to receive selection information for the target when a pause instruction or a remote control instruction for remotely controlling the mobile platform to roll in a direction opposite to a movement direction of a target axis is detected.

11. The device of claim 1, wherein the at least one memory and the computer program code are further configured, with the at least one processor, to:
wait to receive selection information for the target when the mobile platform loses the target and positioning of the mobile platform is inaccurate.

12. The device of claim 1, wherein the at least one memory and the computer program code are further configured, with the at least one processor, to:
determine a parallax value corresponding to the determined distance between the mobile platform and the target based on a correspondence between a distance and the parallax value; and wait to receive selection information of the target in response to a number of parallaxes between a current image taken by the mobile platform and a first image taken by the mobile platform when the mobile platform determines the target reaching the parallax value and a position of the target being not detected.

13. The device of claim 1, wherein the least one memory and the computer program code are further configured, with the at least one processor, to:

control the mobile platform to stop circling the target when a pause instruction or an obstacle is detected.

14. The device of claim 1, wherein the at least one memory and the computer program code are further configured, with the at least one processor, to:

adjust a circling radius of the mobile platform in response to a remote control instruction when the mobile platform circles the target.

15. The device of claim 1, wherein the at least one memory and the computer program code are further configured, with the at least one processor, to:

adjust a circling linear velocity of the mobile platform in response to a remote control instruction when the mobile platform circles the target.

16. The device of claim 1, wherein the program instructions further cause the processor to:

determine the distance between the mobile platform and the target using an imaging device.

17. The device of claim 1, wherein the program instructions further cause the processor to:

receive selection information of the target; and push an alert message for prompting to perform selection of the target again in response to the selection information of the target not satisfying a condition.

18. A mobile platform comprising:

a power device configured to provide power for the mobile platform;

at least one processor; and at least one memory including computer program code, where the at least one memory and the computer program code are configured, with the at least one processor, to cause the device to at least:

in response to receiving an instruction to enter a point of interest (POI) mode:

determine a distance between the mobile platform and a target of the POI mode;

and after the distance is determined, control the mobile platform to circle the target based on the determined distance, wherein the mobile platform does not circle the target before the distance is determined.

19. The mobile platform of claim 18, wherein the at least one memory and the computer program code are further configured, with the at least one processor, to:

in response to receiving the instruction to enter the POI mode:

determine whether a first parameter satisfies a first predetermined condition, the first parameter including one or more of GPS information of the mobile platform, operating parameters of the mobile platform, and a connection state between the mobile platform and a control terminal; and in response to determining that the first parameter does not satisfy the first predetermined condition, control the mobile platform not to enter the POI mode and not to circle the target; or after the mobile platform is controlled to circle the target:

determine whether the first parameter satisfies the first predetermined condition;

and in response to determining that the first parameter does not satisfy the first predetermined condition, control the mobile platform to stop circling the target.

20. A method for controlling a mobile platform, comprising:

receiving, by a processor of a control terminal of the mobile platform, a size of a frame selection area of a first target;

determining whether the size of the frame selection area of the first target is smaller than a predetermined size;

in response to determining that the size of the frame selection area of the first target is smaller than the predetermined size, controlling, by the processor, the control terminal to output an alert message, the alert message prompting to perform frame selection of a second target; and determining the second target and controlling the mobile platform to circle the second target.

* * * * *